April 22, 1924.
W. A. O. HICKS
FRUIT GATHERER
Filed Jan. 10, 1923
1,491,235
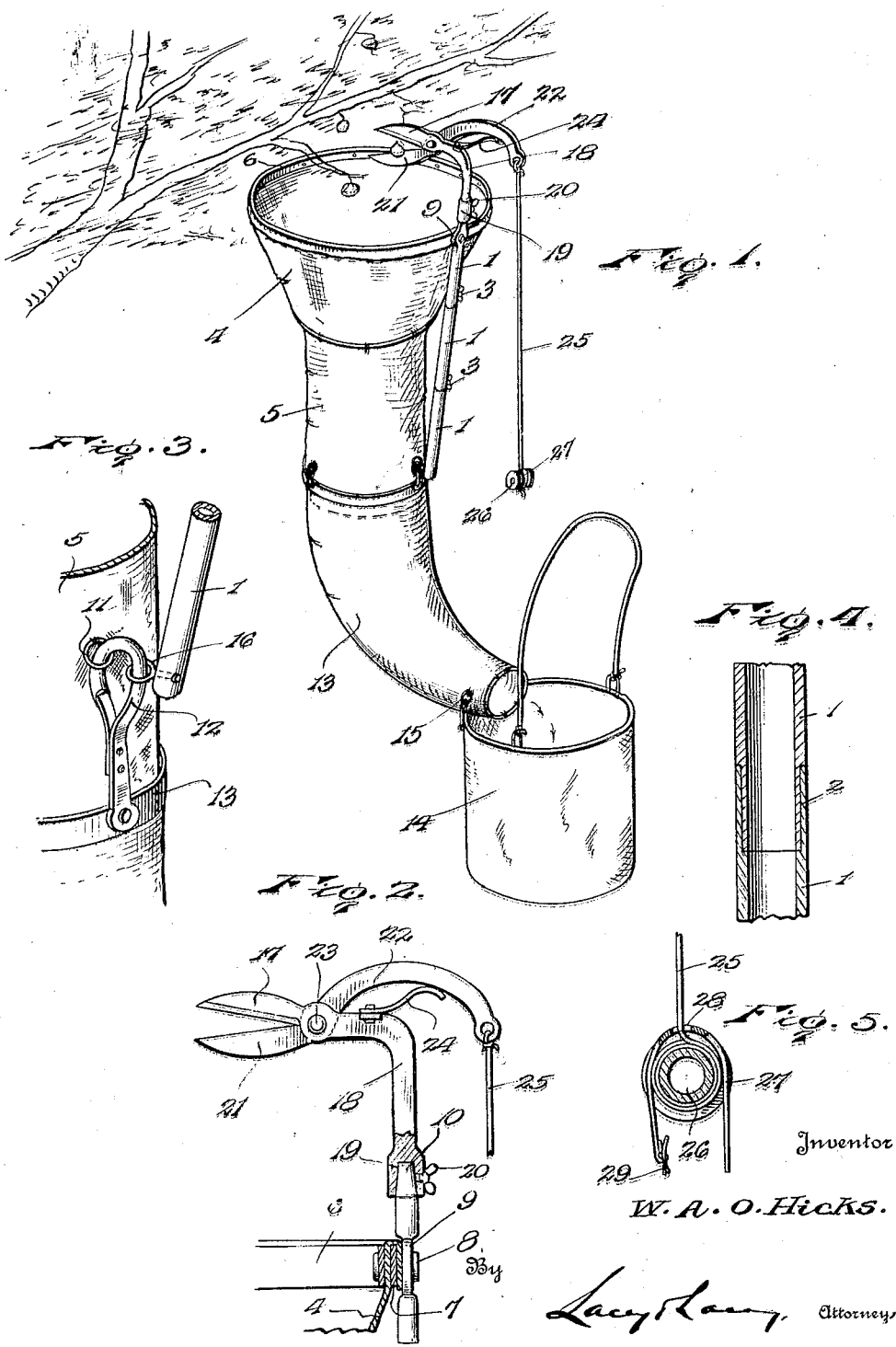

Patented Apr. 22, 1924.

1,491,235

UNITED STATES PATENT OFFICE.

WILLIS A. O. HICKS, OF MONTICELLO, GEORGIA.

FRUIT GATHERER.

Application filed January 10, 1923. Serial No. 611,909.

*To all whom it may concern:*

Be it known that I, WILLIS A. O. HICKS, a citizen of the United States, residing at Monticello, in the county of Jasper and State of Georgia, have invented certain new and useful Improvements in Fruit Gatherers, of which the following is a specification.

My invention is a device for removing oranges and similar fruits from trees and collecting them without injury in a convenient receptacle. The object of the invention is to provide a simple and inexpensive device which may be easily handled and operated by one person and which, when not in use, may be stored within a small compass. Another object of the invention is to provide a construction which will lend itself readily to an extension or prolongation of the device, whereby the cutter may be supported at any desired or necessary height above the ground. Other objects of the invention will appear incidentally in the course of the following description, and the invention resides in certain novel features which will be particularly pointed out in the appended claim.

In the drawing:

Figure 1 is a perspective view of my improved fruit harvester;

Fig. 2 is an enlarged detail sectional elevation of the upper end of the device;

Fig. 3 is an enlarged detail perspective view showing the means for connecting the spout or conveyer tube with the handle or supporting rod;

Fig. 4 is an enlarged detail longitudinal section of a portion of the supporting rod;

Fig. 5 is an enlarged detail view showing a brake device whereby the effective length of the clipper operating cord may be controlled.

In carrying out my invention, I employ a handle member or hollow rod consisting of a series of tubular sections 1 which have their respective ends reduced and recessed to telescope together and form an overlapping joint, as shown at 2. Set screws 3 may be mounted in the ends of the sections so as to bind them together when they are assembled and prevent accidental separation of the same. I also employ a receiver and conveyer which will preferably be constructed of canvas or some similar material which will not injure the fruit and which comprises a receiving funnel-like section 4 and a cylindrical tubular section 5 attached to the lower end of the funnel-like section 4, as clearly shown. The upper edge of the funnel section 4 is fitted between inner and outer metallic rings 6 and 7 and may be folded over the outer ring, as shown in Fig. 2. Rivets or similar fastening devices 8 are inserted through the rings or circular bands 6 and 7 so as to firmly secure the upper end of the funnel between the same whereby the mouth of the funnel will be held firmly in open position to permit the gathered fruit to readily pass through the same. The upper handle section is constructed with a flattened eye portion 9 which will bear against the outer ring or band 7 or against the edge of the fabric folded thereover and receives one of the securing rivets 8 so that the funnel will be carried by the said handle member. The said handle member further projects above the mouth of the funnel and has its extremity tapered, as shown a 10 for a purpose which will presently appear. The upper end of the tube or conveyer section 5 is secured to the lower end of the funnel section 4 and may be stitched thereto or connected therewith by detachable or removable fastenings as may be preferred. Upon the outer side of the said tubular conveyer member, I secure rings 11 in which are engaged hooks 12 secured to the upper end of a conveyer spout member 13, said member being preferably so shaped as to turn to one side so that the descent of the gathered fruit will be checked and directed into a bag 14 or other receptacle carried by the operator. This receptacle may be connected with the delivery end of the conveyer spout 13 by hook and eye fastenings, indicated at 15. In the lower extremity of the handle or supporting rod, I secure an eye or ring 16 which is also engaged by one of the hooks 12 on the upper end of the conveyer spout 13 so that the conveyer will be held to the handle and may be more easily supported. The operator is also enabled by this arrangement to prevent excessive swaying of the conveyer under the influence of possible strong winds so that the fruit will not be tossed about within the conveyer and subjected to possible injury and bruising.

To remove the fruit from a tree, I provide a cutter consisting of a stationary blade 17 having a shank 18 which is turned downwardly and constructed with a socket 19 at its lower end to fit over the tapered extremity 10 of the supporting rod and be secured thereon by a set screw 20 mounted in the side of the socket and adapted to bear upon the side of the supporting rod, as will be readily understood. The blade will thus be rigidly supported over the mouth of the funnel and the parts are so proportioned that the blade will be approximately in vertical alinement with the center of the funnel. Pivotally attached to the side of the stationary blade 17 is an oscillatory blade 21 which is arranged directly below the stationary blade and adapted to co-operate therewith so as to make a shearing cut through the stem of the fruit and thereby sever the fruit from the tree without injuring the fruit or the tree. The shank 22 of the blade 21 crosses the shank of the blade 17 at the pivot 23 and is, therefore, disposed above the shank 18. A spring 24 is secured upon the shank 18 and bears against the under edge of the shank 22 so that the blades are normally held in open position so that they may be easily disposed at opposite sides of the stem of an orange which is to be harvested. To the free end of the shank 22, I attach an operating cord 25 which depends from the said shank and has its lower portion wound upon a spool 26 which may be utilized as a handle through which to exert a pull upon the cord. To regulate the effective length of the cord, I provide a brake member consisting of a flexible strap 27 adapted to wrap about the spool and the cord wound thereon and having an opening 28 through which the working portion of the cord may pass, as shown in Fig. 5. The strap is provided with a buckle 29 or other fastening device so that, after the proper length of the cord has been unwound, the strap may be tightened about the spool and the wound portion of the cord and thereby prevent further unwinding.

It is thought the operation of the device will be readily understood from the foregoing description, taken in connection with the accompanying drawings. The device is first given the proper length according to the height of the trees from which fruit is to be gathered by assembling the requisite number of the handle sections 1 and interposing as many of the tubular sections 5 as may be needed between the funnel 4 and the spout 13. The funnel 4, the intermediate section 5 and the conveyer section 13 constitute a fabric tubular conveyer having its sections arranged end to end, and it will, of course, be understood that one or more of the intermediate sections may be employed as desired. The bag or other receptacle 14 is supported upon the shoulders of the operator in an obvious manner and the harvester is then raised into a substantially upright position and held in such position by the operator grasping the supporting rod, as will be readily understood. The cutter is disposed with its blades at opposite sides of the stem of the fruit and a downward pull is exerted upon the cable 25 so that the rocking blade 21 will be swung to the stationary blade 17 and caused to pass through the fruit stem. The fruit will at once drop through the funnel and the conveyer to the spout 13 and thence pass into the receptacle 14. My fruit gatherer is obviously simple in the construction and arrangement of its parts and may be produced at a low cost. It may be easily operated and will efficiently and quickly remove the fruit from the trees and, when not in use, the several parts may be very readily disassembled so that it may be stored in a small compass.

Having thus described the invention, what is claimed as new is:

A fruit gatherer comprising a supporting rod, a cutter carried by the upper end of the supporting rod, means for operating the cutter, a fabric tubular conveyer comprising a funnel section having its upper end secured to the supporting rod, an intermediate section secured at its upper end to and extending downwardly from the lower end of the funnel and a spout section, said sections being arranged end to end, rings secured upon one section adjacent the lower end thereof, hooks secured to the upper end of the subjacent section and engaged in said rings, and a ring carried by the lower end of the supporting rod and also engaged with one of the same hooks.

In testimony whereof I affix my signature.

WILLIS A. O. HICKS. [L. S.]